(12) United States Patent
Smith et al.

(10) Patent No.: US 7,255,525 B2
(45) Date of Patent: Aug. 14, 2007

(54) ONLINE, SAFE SERVICE TECHNIQUE FOR AUTOMATED LIBRARIES

(75) Inventors: Frank Tucker Smith, Nederland, CO (US); Timothy C. Ostwald, Louisville, CO (US); James M. Frary, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 988 days.

(21) Appl. No.: 10/033,879

(22) Filed: Dec. 19, 2001

(65) Prior Publication Data

US 2003/0113191 A1 Jun. 19, 2003

(51) Int. Cl.
 *B65G 1/137* (2006.01)
(52) U.S. Cl. ..................................... 414/273
(58) Field of Classification Search ................ 414/273, 414/274, 217, 806; 345/90, 94
 See application file for complete search history.

(56) References Cited

U.S. PATENT DOCUMENTS

| 4,005,838 | A | * | 2/1977 | Grundy ................. 246/182 B |
| 4,265,337 | A | * | 5/1981 | Dammeyer ................. 187/224 |
| 4,502,375 | A | * | 3/1985 | Hignite et al. ................. 454/56 |
| 4,920,520 | A | * | 4/1990 | Gobel et al. ................... 367/99 |
| 5,280,622 | A | * | 1/1994 | Tino ........................... 700/255 |
| 5,898,593 | A | * | 4/1999 | Baca et al. ................. 700/214 |
| 6,145,571 | A | * | 11/2000 | Snyder ....................... 160/264 |
| 6,158,942 | A | * | 12/2000 | Apple et al. ................ 414/273 |
| 6,405,114 | B1 | * | 6/2002 | Priestley et al. .............. 701/50 |
| 2002/0009512 | A1 | * | 1/2002 | Faiman et al. .............. 425/135 |

* cited by examiner

*Primary Examiner*—Charles A. Fox
(74) *Attorney, Agent, or Firm*—Brooks Kushman P.C.

(57) ABSTRACT

A safety system for online servicing of a media library is provided, wherein the library comprises a plurality of media storage cells and at least one media picker robot that moves along the media storage cells, and wherein the library is contained within an enclosure having at least one access means. The safety system detects whether the access means in the enclosure is open or closed and operates the robot in the media library in one of two corresponding modes. If the access means is closed, the robot operates in a normal mode at a first specified speed. If the access means is open, the robot operates in a safe mode at a second specified speed that is slower than the first speed of the normal mode. In another embodiment, while in safe mode, the picker robot is excluded from moving within a restricted zone in the library.

6 Claims, 6 Drawing Sheets

ONLINE, SAFE SERVICE TECHNIQUE FOR AUTOMATED LIBRARIES

BACKGROUND OF THE INVENTION

1. Field of the Invention

The present invention relates generally to media storage libraries, and more specifically to safety measures for service personnel.

2. Background of the Invention

Current media library systems contain multiple independent robots for concurrently manipulating multiple media cartridges. The library system comprises an array of media storage cells and media cartridge players. A system of rails is used to guide robotic pods through all of the locations on the array.

The current enterprise class library has a few redundant features, such as redundant robots and the robot servo controllers. However, there are still many potential single points of failure in the robotics electrical components (i.e. main controller, interrupt controller, etc.). If a failure occurs in one of these components, it may make the unit non-operational. Currently, there is a customer demand for high availability (99.999% run time) on enterprise class tape automated libraries, which requires minimum system down time due to individual component failures.

Many types of system failures can be accommodated by automated backup systems that compensate for failed parts and maintain library function. However, even with such backup systems in place, the failed components must be serviced and/or replaced, which requires the intervention of a human operator. In addition, human intervention may be required for simple maintenance or upgrades. Ideally, such human invention should minimally impact library performance. At the same time, the safety of the human operator must also be preserved.

Normally, when a problem or system failure arises, e.g., jammed robot picker, the service person must take the library offline in order to make repairs, resulting in less library uptime and lower overall performance.

Therefore, it would be desirable to have a method for ensuring the safety of human operators who service automated libraries, while allowing the library to continue operations during the servicing.

SUMMARY OF THE INVENTION

The present invention provides a safety system for online servicing of a media library, wherein the library comprises a plurality of media storage cells and at least one media picker robot that moves along the media storage cells, and wherein the library is contained within an enclosure having at least one access means. The safety system comprises a sensor that detects if the access means in the enclosure is open and a control component that operates the robot in the media library in one of two modes. If the access means is closed, the robot operates in a normal mode, wherein the robot moves at a first specified speed. If the access means is open, the robot operates in a safe mode, wherein the robot moves at a second specified speed that is slower than the first speed of the normal mode. In another embodiment, while in safe mode, the picker robot is excluded from moving within a restricted zone in the library.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
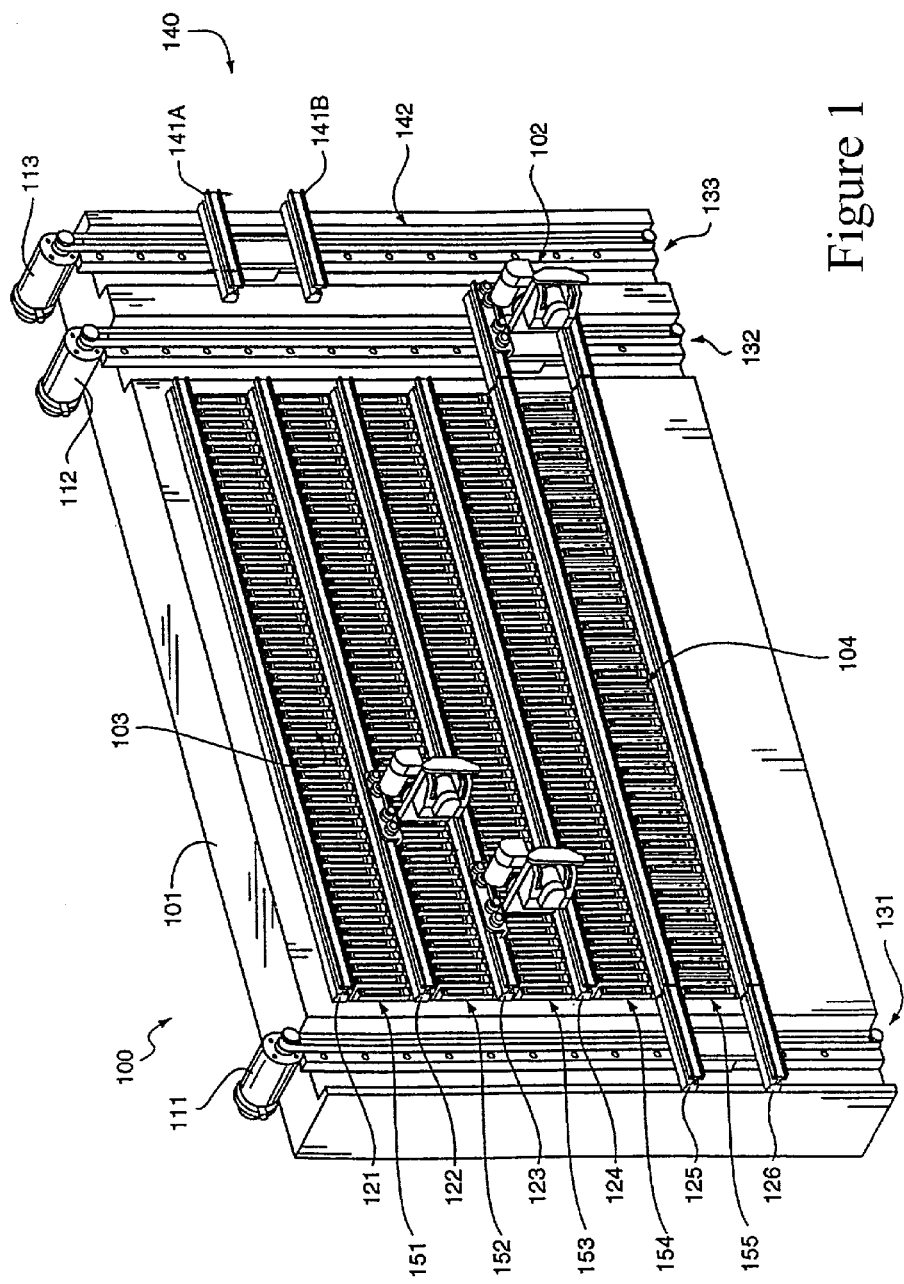
FIG. 1 depicts a perspective pictorial diagram illustrating the architecture of a single library storage module in accordance with the present invention.

The architecture of the present automated library system 100 is illustrated in FIG. 1 and contains the multiple independent robots 102 to enable the library system 100 to concurrently manipulate multiple media cartridges 105. The library system 100 comprises a two-dimensional array of media cartridge storage cells 103 and media cartridge players 104 that are mounted in a frame 101. A system of rails 121-126 is used to guide robotic pods 102 through all of the locations in the array, which eliminates the need for any steering or guide mechanisms on board the robotic pods 102, resulting in a reduction in the mass of the robotic pods 102. The rail system 121-126 also constrains the movement of the robotic pods 102 into horizontal and vertical movements, thereby simplifying the control algorithms for collision avoidance that are required by a typical random moveable object handling system based on horizontal, vertical and diagonal degrees of freedom. The robotic pods 102 contain a moveable carriage that is capable of transporting robotic components, such as media cartridge pickers, bar code reading devices, and other task oriented sub-modules, on the storage library rail system.

As shown in FIG. 1, the frame 101 is designed to receive a plurality of rows 151-154 of media cartridge storage cells 103, each of which is designed to house a single media cartridge 105. The media cartridge players 104 are shown in an arbitrary location in a horizontal row 155 at the bottom of the frame 101, although the library system 100 can incorporate media cartridge players 104 at any location in the frame 101 to optimize performance. The robotic pods 102 are attached to the frame 101 via horizontal guide rails 121-126, which serve to frame the media cartridge storage cells 103 and media cartridge players 104 on the top and bottom sides thereof. FIG. 1 shows an array of media storage cells 103 fully populated with media cartridges 105 of any arbitrary type. The robotic pod guide rails 121-126 provide support of the robotic pods 102 in the vertical direction to oppose the force of gravity, and they also provide a meshing surface of suitable design to impart traction in the horizontal direction for motive transport of the robotic pods 102. The robotic pods 102 each incorporate a drive means for propulsion in the horizontal direction along the guide rails 121.

FIG. 1 also shows a plurality of vertical elevator assemblies 131-133 that enable the transfer of the robotic pods 102 in the vertical direction. Multiple vertical elevator assemblies 131-133 are shown in FIG. 1 to exemplify the extensibility and redundancy of the invention. Each of the vertical elevator assemblies 131-133 comprise a set of vertical rails 142 that extend substantially from the top of the frame 101 to the bottom of the frame 101. The vertical rails 142 support a plurality of elevator stations 140, each of which contain short horizontal rail segments 141A, 141B that are identical in cross section to the main horizontal guide rails 121-126. The elevator stations 140 are held in suspension by a drive belt 143 which is made to wrap around a drive pulley attached to a vertical drive motor 113 that is located at the top of each elevator assembly 133. When a vertical displacement is required of any robotic pod 102, the vertical elevator 140 is scheduled to move in alignment to the appropriate level of rows 151-155 to allow transfer of the robotic pod 102 onto the elevator rail section 141A, 141B from the pair of horizontal rails 121-126 that are juxtaposed and abutting to the elevator rails 141A, 141B. Once the robotic pod 102 is located on the elevator station 140, the drive motor 113 is activated to transport the robotic pod 102 to a selected one of rows 151-155 and thence moves on to the pair of horizontal rails 121-126 that correspond to the selected row. Elevator assemblies 131-133 can carry more than one robotic pod 102 at a time by adding elevator platforms 140 to the elevator assemblies 131-133 or by extending the elevator platform length to accommodate multiple robotic pods 102 on a single elevator station 140.

Figure 2:
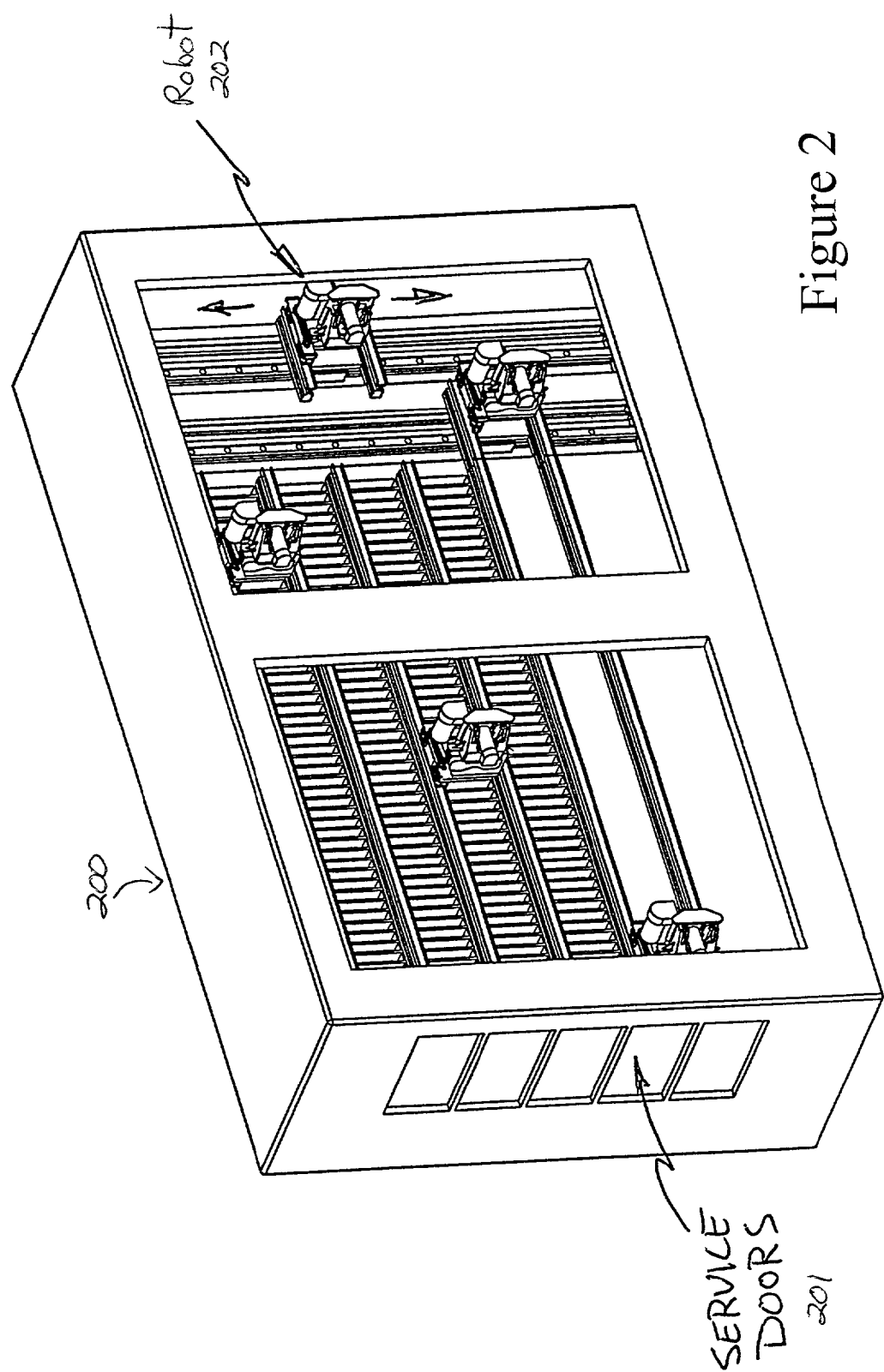
FIG. 2 depicts a pictorial diagram illustrating an enclosed library module with service doors in accordance with the present invention.

Referring to FIG. 2, a pictorial diagram illustrating an enclosed library module with service doors is depicted in accordance with the present invention. Library 200 comprises a library module, similar to library 100, within a protective enclosure. Service doors, e.g., 201, are at either end of the library 200 (only one is pictured). These service doors 201 allow service personnel to access robots, e.g., 202, in need of servicing. Placing service doors at both ends helps facilitate access to the robots, depending on the location of a given robot within the library 200. This is particularly true if a robot becomes stuck and cannot be moved to a preferred location for servicing, but must be manually retrieved from within the library 200.

Figure 3:
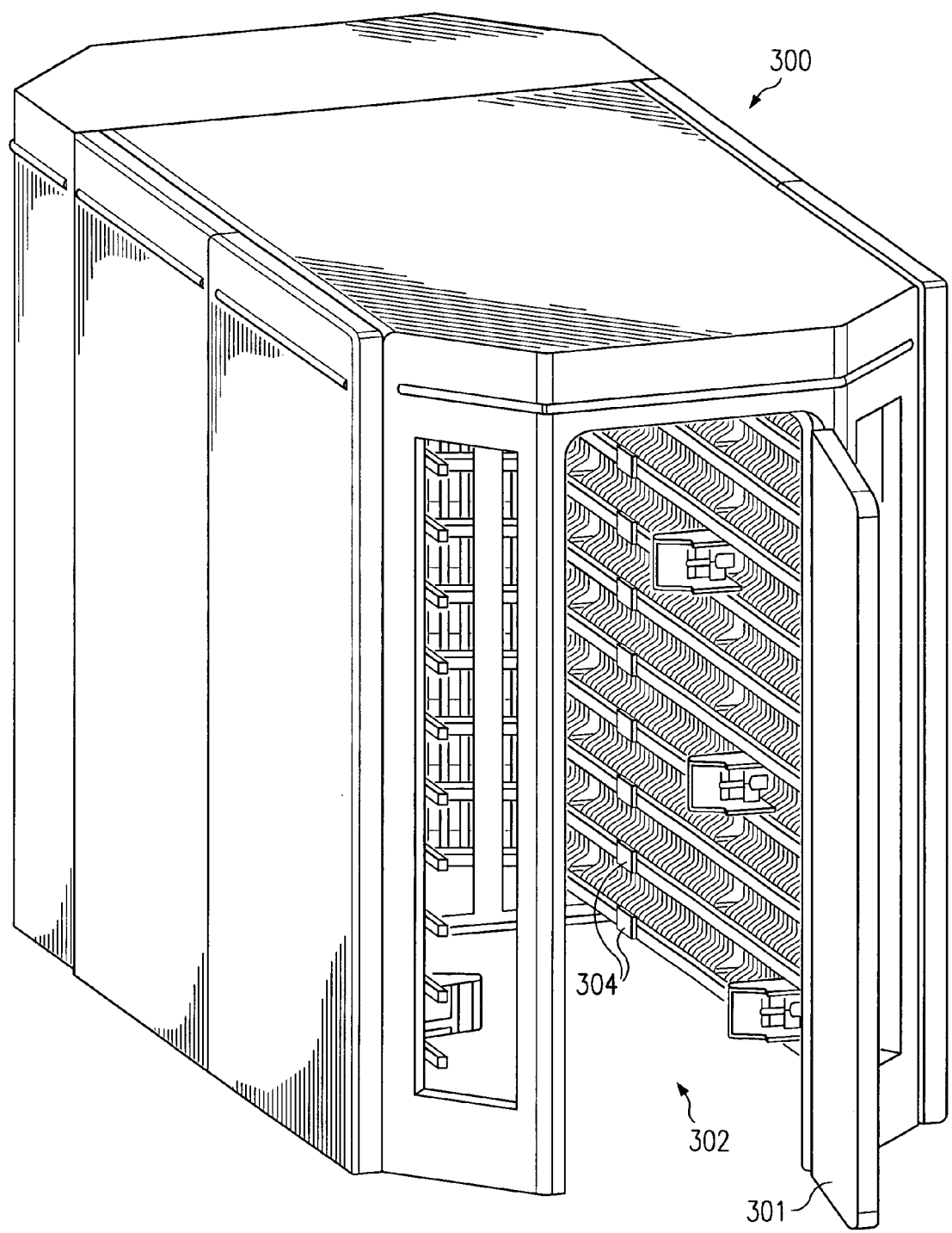
FIG. 3 depicts a pictorial diagram illustrating a library system with a walk-in service space is depicted in accordance with the present invention.

Referring to FIG. 3, a pictorial diagram illustrating a library system with a walk-in service space is depicted in accordance with the present invention. Library 300 comprises several storage cell modules arranged in banks, which are place along the walls of an enclosure. Library 300 contains a single service door 301, which enables a service technician to enter a walk-in work space 302. Within this work space, the operator may access and service any of the components in the library, e.g., robots, guide rails, storage cells, and media drives. Additionally, some preferred embodiments of innovative library 300 include mechanical stops 304, described below.

Figure 4:
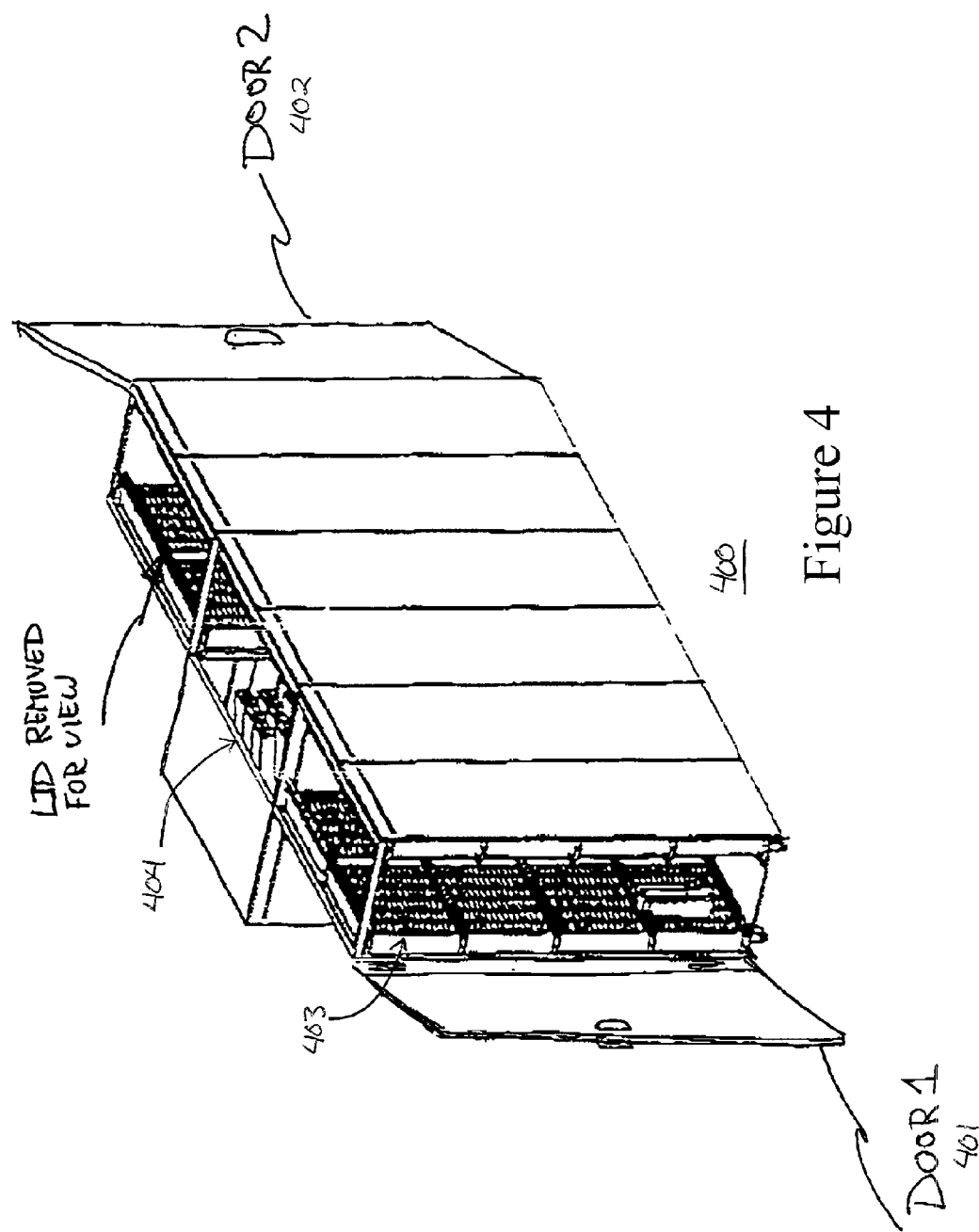
FIG. 4 depicts a pictorial diagram illustrating a library enclosure with access doors at both ends in accordance with the present invention.

Referring to FIG. 4 a pictorial diagram illustrating a library enclosure with access doors at both ends is depicted in accordance with the present invention. Library 400 comprises several banks of storage cell arrays, e.g., 403, on either side of a bank of media players 404. Because of the relatively long, narrow shape of library 400, access doors 401 and 402 are placed at both ends in order to allow easier access to the working components.

FIGS. 2, 3, and 4 are offered merely as examples of different designs for allowing service access to storage libraries that are enclosed to protect both personnel and moving components from injury and damage due to collision. The present invention allows service personnel to access the working components of a storage library without having to halt library operations, while still ensuring the safety of those personnel. This invention can be applied to many types of library designs employing various methods of service access.

Figure 5:
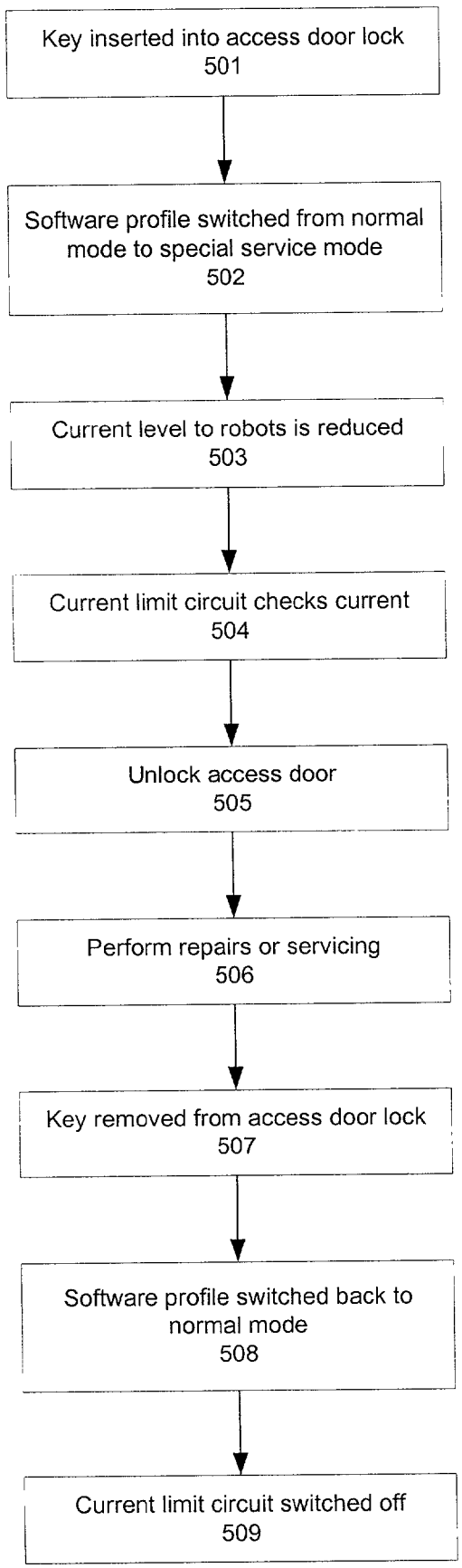
FIG. 5 depicts a flowchart illustrating the safety procedure for online library servicing in accordance with the present invention.

Referring to FIG. 5, a flowchart illustrating the safety procedure for online library servicing is depicted in accordance with the present invention. The process is initiated when a service operator activates the lock, handle, latch, etc., on a service door on the library (step 501). This activation may take several forms, e.g., inserting a key or entering a code on a keypad. The important point is that the service door remains locked until an access request is validated and the safety procedures have been activated.

After the service door lock has been validly activated (e.g., correct key or combination), the profile of the control software is changed from normal mode to safe service mode (step 502). In normal mode, the media retrieval robots move at optimal operating speeds. However, when a service door is opened while the library is in normal mode, the robots stop moving, thus bringing the library offline. In safe service mode, the robots are allowed to continue operating when the service door is unlocked and opened, but the robots move at a slower speed to reduce the chances of injuring the human operator servicing the library.

When the control software changes over to safe service mode it slows down the robots by reducing the available power levels to the robot servo motor (step 503). This usually involves reducing the electrical current to the robot servo motors, resulting in lower torques produced by the drive motors. These lower torques are at a level which will not put a service operator at risk if that person inadvertently gets in the way of a moving robot.

In addition to reducing the power supply to the robot motors, the control software can define a work zone within the library into which the robots are not allowed to enter (as explained below).

The activation of the service door lock also engages a current limit circuit, which restricts the level of power supplied to the robot drive motors (step 504). This current limit circuit provides a hardware backup to the control software. This backup circuit ensures that even if an error occurs in the safe mode software profile during repairs, the robots will still not injure the service operator working on the library.

The service door is unlocked and allowed to open after the safe mode command profile is initiated and the current limit circuit is engaged (step 505).

The human operator may then perform any needed repairs or servicing (step 506).

When the service is complete, the operator closes the door and removes the key from the lock, thus relocking the door (step 507). Alternatively, the operator may enter a "clear" code from a keypad, or the door may lock automatically when closed, depending on the particular design of the library. For example, library 300 in FIG. 3 would probably require the key to be removed or a clear code entered rather than automatically locking the service door 301, so as to prevent a service operator from being trapped in the library service area 302 and switching the robots back to full speed.

In contrast, service door 201 in FIG. 2 might lock automatically after it is closed, because the operator cannot be trapped inside the small library enclosure.

After the service door is closed and locked, the normal mode software profile takes over again (step 508), and the current limit circuit is deactivated (step 509), thus allowing the robots to resume their normal movement speed.

As stated above, defined work zones may also be used to protect service personnel working on library systems. A zone is defined as a volume in space in which activity of the robots is halted or excluded. For example, when a human operator uses an access door to enter a section of the library, the control software may move the robots out of that zone and prevent them from reentering, or simply stop the robots within the zone until the access door is closed.

Figure 6:
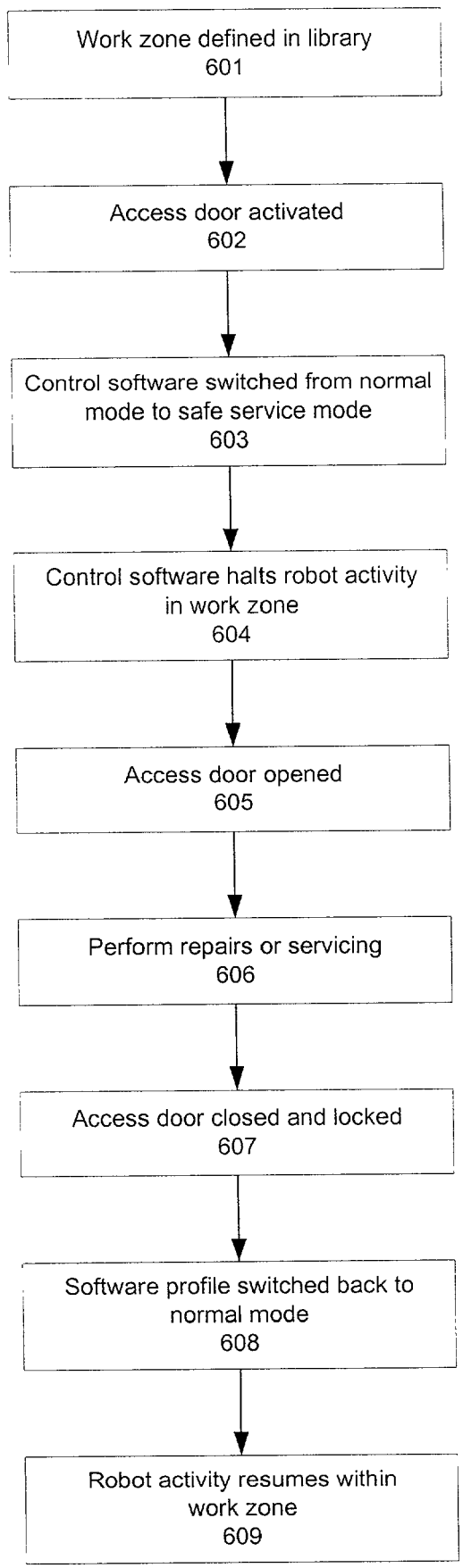
FIG. 6 depicts a flowchart illustrating the process of using a work zone during human intervention in accordance with the present invention.

Referring to FIG. 6, a flowchart illustrating the process of using a work zone during human intervention is depicted in accordance with the present invention. The process begins by defining the work zone(s) within the library enclosure (step 601). This work zone might be automatically predefined, e.g., in relation to a particular service door, if there are multiple doors in the library in question. Alternatively, the work zone may be manually defined by the operator before activating the safety procedures. For example, the operator might specify the particular location within the library needing repair. The control software would then use this information to create the work zone. The control software may also define work zones in response to internal diagnostics.

As with FIG. 5, when the lock on the access door is activated, signaling that the access door is going to be opened (step 602), the software profile switches from normal mode to safe service mode (step 603). As explained below, the work zone mode and slow mode may be combined into the same software profile and used in conjunction.

The control software then restricts robot activity in the work zone (step 604). The means for restricting robot movement within the zone is similar to those described for slowing the robots. In addition to diverting robots from the work zone, the control software and electrical circuits may cut off power to the work zone. In addition, solenoids could move mechanical "stops" into place to prevent a robot from approaching the human operator. Examples of other methods include infrared (IR), ultrasonic, or contact sensors that detect a human activity within or near the work zone, and then prevent the robots from entering that zone, or divert any robots already in the zone.

The access door can then be opened and the required service performed (step 605).

The human operator performs any needed repairs or servicing (step 606).

When the work is completed, the access door is closed and relocked (step 607), causing the control software to switch back to normal mode (step 608). Robot activity then resumes within the previous work zone(s) (step 609).

The work zone concept may be combined with the slow safe mode solution in numerous ways. For example, when a human operator enters a section of the library, all robots may be slowed down, and robots with then specific work zone may be stopped or diverted to other library sections. The particular combination and application of methods will depend on the physical layout of the library system in general, and the type of human intervention required.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A safety system for a media library comprising a plurality of media storage cells and at least one media picker robot that moves along the media storage cells, wherein the library is contained within an enclosure having at least one access means, the safety system comprising;
    an access sensor that detects if the access means in the enclosure is open; and
    a control component that operates the robot in the media library in one of the following modes:
    if the access means is closed, a normal mode, wherein the picker robot automatically moves at a first specified speed; and
    if the access means is open, a safe mode, wherein the picker robot automatically moves at a second specified speed that is a non-zero speed and is slower than the first speed of the normal mode.

2. The system according to claim 1, wherein:
    the access sensor also detects if the access means is locked; and
    the control component operates the robot in safe mode only if the access means is unlocked.

3. The system according to claim 1, wherein the slower robot speed of the safe mode is implemented by means of control software that reduces power to robot.

4. The system according to claim 1, wherein the slower robot speed of the safe mode is implemented by means of an electrical circuit that limits power to the robot.

5. The system according to claim 1, wherein the media library further comprises a plurality of picker robots that are responsive to the control component.

6. The system according to claim 1, wherein tho media Library further comprises a plurality of access means associated with the access sensor.

* * * * *